(12) United States Patent
Skinner et al.

(10) Patent No.: US 7,359,516 B1
(45) Date of Patent: Apr. 15, 2008

(54) USER INTERFACE TECHNIQUE FOR SELECTION AND ACTIVATION OF WIRELESS SERVICES FROM AMONG MULTIPLE TRANSPORT CARRIERS

(75) Inventors: Craig Skinner, Snohomish, WA (US); William Shu-woon Wong, Issaquah, WA (US); Brian Gerald Kuhn, Palo Alto, CA (US)

(73) Assignee: PalmSource, Inc., Sunnyvale, CA (US)

( * ) Notice: Subject to any disclaimer, the term of this patent is extended or adjusted under 35 U.S.C. 154(b) by 587 days.

(21) Appl. No.: 09/732,066

(22) Filed: Dec. 7, 2000

(51) Int. Cl.
*H04K 1/00* (2006.01)
(52) U.S. Cl. .................... 380/270; 380/247; 455/435.1
(58) Field of Classification Search ................ 455/411, 455/419, 422, 432, 456, 515, 435.2, 461, 455/3.04, 435.1, 17, 552, 433, 414, 435; 709/219, 227, 228; 713/169, 171; 726/3; 380/247, 270
See application file for complete search history.

(56) References Cited

U.S. PATENT DOCUMENTS

| | | | | |
|---|---|---|---|---|
| 6,035,212 A | * | 3/2000 | Rostoker et al. | ......... 455/552.1 |
| 6,466,783 B2 | * | 10/2002 | Dahm et al. | ............. 455/414.2 |
| 6,542,740 B1 | * | 4/2003 | Olgaard et al. | ............. 455/515 |
| 6,647,260 B2 | * | 11/2003 | Dusse et al. | ................ 455/419 |
| 6,732,176 B1 | * | 5/2004 | Stewart et al. | .............. 709/227 |

* cited by examiner

*Primary Examiner*—Ellen Tran
(74) *Attorney, Agent, or Firm*—Berry & Associates P.C.

(57) ABSTRACT

A method and device are provided for handling network activation between a computer and a carrier. In one example, the method involves receiving a command to initiate network activation procedures. The network activation status of the computer is then determined. If the computer is network enabled, a request is sent to a device having network activation information. The network activation information is received from the device. The computer is then configured with the network activation information in order to establish network activation with the carrier.

24 Claims, 3 Drawing Sheets

USER INTERFACE TECHNIQUE FOR SELECTION AND ACTIVATION OF WIRELESS SERVICES FROM AMONG MULTIPLE TRANSPORT CARRIERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This application is related to U.S. patent application Ser. No. 09/850,940 filed on the same date as the present application entitled "GENERIC ACTIVATION AND REGISTRATION FRAMEWORK FOR WIRELESS DEVICES," by inventor Brian G. Kuhn, the entire disclosure of which is hereby incorporated by reference as if fully set forth herein.

BACKGROUND OF THE INVENTION

1. Field of the Invention

The present invention generally relates to wireless networks and, more particularly, to wireless network activation with carriers.

2. Discussion of Background

The wireless communication revolution is bringing fundamental changes to data networking and telecommunication, and is making integrated networks a reality. By freeing the user from the cord, personal communications networks, wireless local area networks (LAN's), and mobile radio networks and cellular systems harbor the promise of fully distributed mobile computing and communications, any time, anywhere. Numerous wireless services are also maturing and are poised to change the way and scope of communication.

Many manufacturers have begun to incorporate wireless technologies into a new kind of computer—the personal digital assistant (PDA). A PDA is a computer that is small enough to be held in the hand of a user. A PDA runs personal information management applications such as an address book, a daily organizer, and electronic notepads. These applications make people's lives easier.

FIG. 1 shows a basic configuration of a popular PDA brand, the Palm™ 10. However, the Palm™ 10 is much more than a simple PDA. This small, slim, device, about the size of your wallet, can hold 6000 addresses, 5 years of appointments, 1500 to-do items, 1500 memos, 200 e-mail messages, and can run many different software applications.

The front panel of the Palm™ 10 is a large liquid crystal display ("LCD") 11, which is touch-sensitive and allows a user to enter and manipulate data. By using a stylus (not shown) to interact with the touch-sensitive screen, a user may easily navigate through a host of various software applications. A stylus is used to interact with information on a screen in much the same way a mouse is used with a desktop personal computer. The display device also includes a Graffiti™ writing section 12 for tracing alphanumeric characters as input.

Regarding wireless connectivity, a given wireless network typically has many different carriers for the same network type. For example, Bell South™ and Rogers AT&T™ are wireless carriers that both run Mobitex™ networks. Further, many wireless computers are manufactured to be compatible with a particular network type and/or carrier.

Unfortunately, problems arise when a consumer, manufacturer, or carrier later desires the computer to be compatible with another network or another carrier. Integrated within the computer's architecture, may be an operating system that allows a user to connect with a specific carrier or transport mechanism. For example, applications that allow connectivity with a specific carrier, such as BellSouth™, may be written to a read-only memory (ROM) of the PDA. Such a framework makes it difficult to later make the PDA compatible with another carrier or with another type of network.

The PDA that is compatible with only BellSouth™ can not be taken to Europe to be compatible with a French carrier, much less a wireless network in France. Thus, the manufacturer that builds the PDA that is compatible with BellSouth™ will have to build a different PDA to be compatible with a French carrier, and another device for Australia, and another for Japan, etc.

While a PDA may be manufactured for a regional carrier, wireless networks naturally provide users with extended computing capabilities and mobility. Users are able to move about, carrying their computers with them and maintaining uninterrupted communication with their servers. Wireless networks should be able to allow users to turn on their computers almost anywhere in the world, to establish access to their home servers, and to retrieve their files and email. Such mobility, however, is difficult with commonly available wireless technology.

Consequently, the implementation of wireless networks presents new problems. Unfortunately, classical communication theory and wired network models does not efficiently solve these new problems.

SUMMARY OF THE INVENTION

It has been recognized that what is needed is a framework for providing broader compatibility with wireless networks. Broadly speaking, the present invention fills these needs by providing a method and device for handling network activation between a computer and a carrier. It should be appreciated that the present invention can be implemented in numerous ways, including as a process, an apparatus, a system, a device or a method. Several inventive embodiments of the present invention are described below.

In one embodiment, a method is provided for handling network activation between a computer and a carrier. The method includes the following: receiving a command to initiate network activation procedures; determining a network activation status of the computer; sending a request to a device having network activation information; receiving the network activation information from the device; and configuring the computer with the network activation information in order to establish network activation with the carrier.

In another embodiment, a plug-in device is provided. The plug-in device is configured to be operable in a generic activation framework. The plug-in device includes an application program interface (API) tailored to a particular carrier, wherein the API is configured to receive a network activation command from a generic driver device in a computer.

Advantageously, the present invention provides a generic framework for network activation. The generic framework can be configured to be compatible with multiple carriers for any language. The generic framework can also be used for multiple wireless network types. No longer does a personal computer have to be manufactured to be compatible with individual carriers or specific networks. Easily installable plug-in devices can be tailored to each carrier or network type. Accordingly, carriers can readily make themselves compatible with a given personal computer without having to change the personal computer's ROM to fit the particular carrier or network type. Thus, a generalized infrastructure is put in place to bring new carriers and personal computers online substantially quicker.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention for a method and device for handling network activation between a computer and a carrier is disclosed. Numerous specific details are set forth in order to provide a thorough understanding of the present invention. It will be understood, however, to one skilled in the art, that the present invention may be practiced without some or all of these specific details.

General Overview

Figure 1:
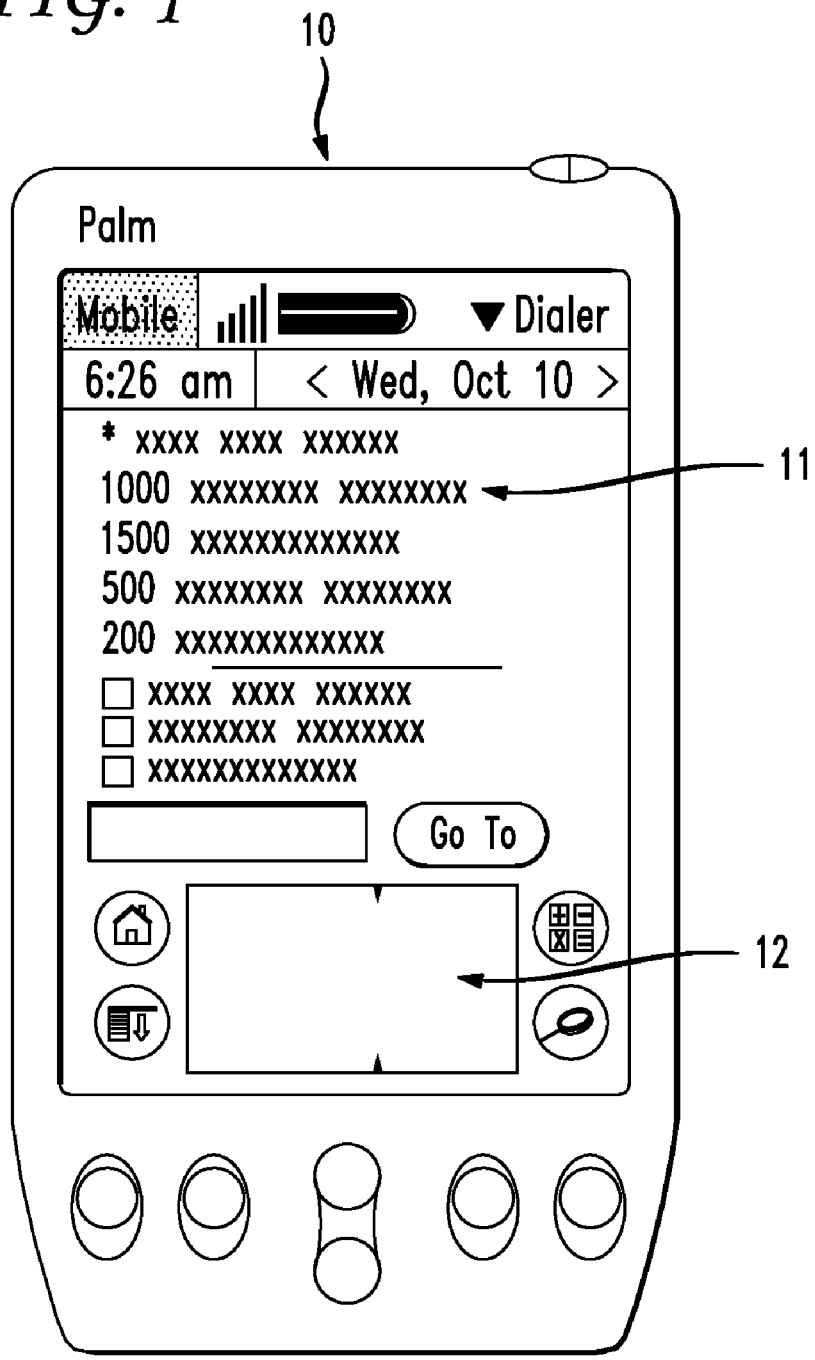
FIG. 1 shows a basic configuration of a popular PDA brand, the Palm™.
Figure 2:
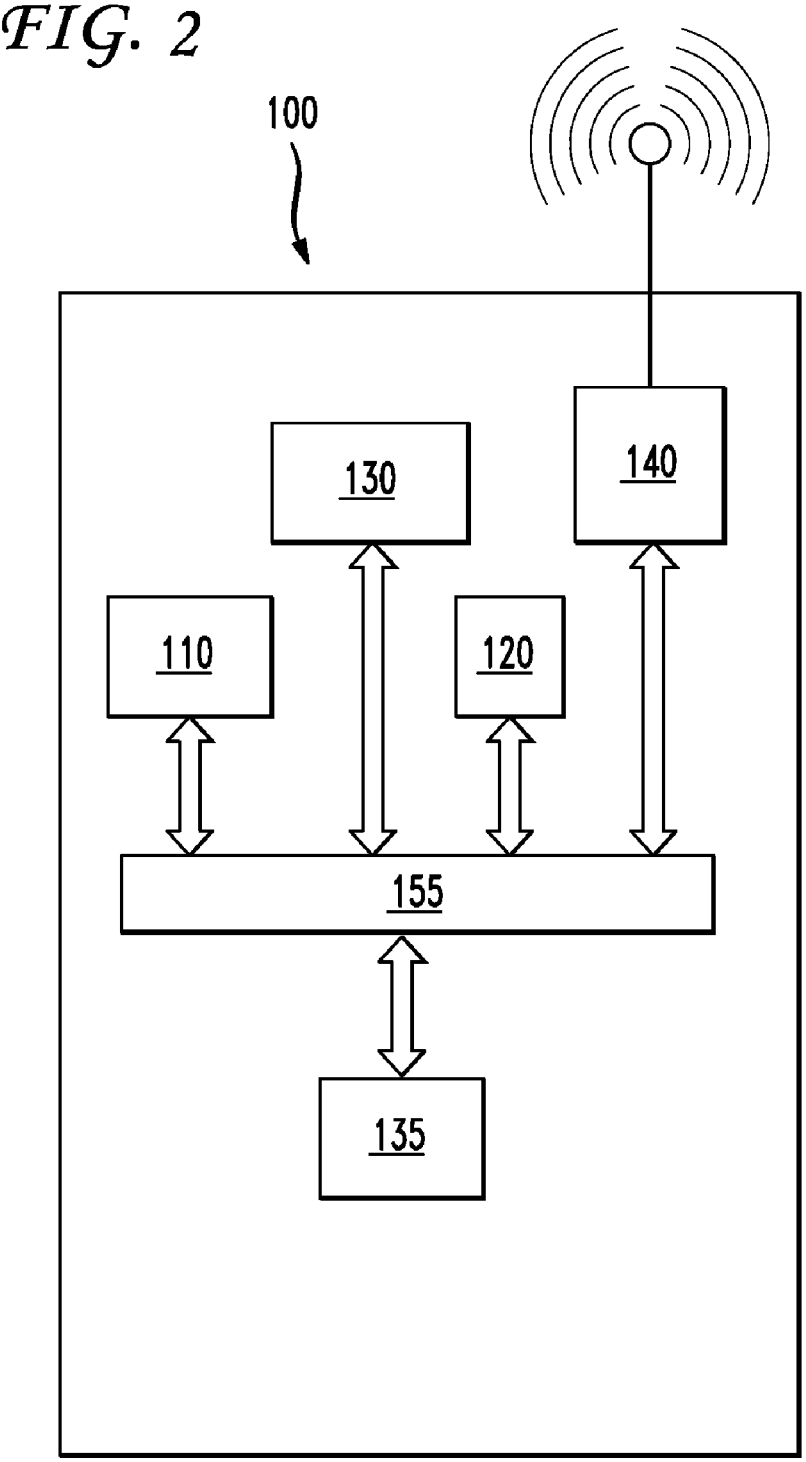
FIG. 2 is a block diagram of selected components of a computer that includes wireless network technology, in accordance with one embodiment of the present invention.

FIG. 2 is a block diagram of selected components of a computer 100 that includes wireless network technology, in accordance with one embodiment of the present invention. The computer 100 includes a processing device 110, for executing applications and an operating system of the computer 100, a memory device 120 for storing the operating system, data, and applications (including plug-in executable files).

A display screen 130 is provided (preferably a touch sensitive screen) for display of operating system prompts, buttons, icons, application screens, and other data, and for providing user inputs via tapping or touching (or drawing in the Graffiti™ area) via a stylus or other touch mechanism. Hardware interface 135 connects to physical hard buttons and switches located on a body of the computer 100 and provides signals to applications running on the processing unit 110.

A bus 155 carries data and commands to/from the processing unit 110 from/to other devices within the computer 100. For example, user applications running on the computer 100 may be stored in the memory device 120. The user applications send application screens and other data outputs to display screen 130 for display via the bus 155. User inputs (Graffiti™ area drawing, or tap selection, for example) are detected by the screen 130 and sent to the processing unit 110 via the bus 155.

A mobile radio device 140 (part of the wireless technology in the computer 100) provides connectivity to a wireless network (not shown). The mobile radio device 140 is configured to detect inbound network transactions from the network directed toward the mobile radio device 140. For example, the inbound network transaction may be a page notification that is sent to a pager device executing on the processing unit 110.

In the embodiment of FIG. 2, the computer 100 is illustrated as a personal digital assistant (PDA). A PDA is a handheld computer such as a Palm™, Palm III™, or Palm V™, or Palm VII™ organizers, manufactured by Palm, Inc. Other embodiments of the invention can include Windows CE™ and Visor™ handheld computers, other handheld computers, other personal digital assistants (PDAs), desktop computers, laptop computers, workstations, or mainframes.

The Palm™ and its operating environment are used herein to illustrate various aspects of the present invention. However, it should be understood that the present invention may be practiced on other devices, including other Palm™ models, PDA's, computer devices, personal computers, notebooks, etc.

General Overview of Generic Activation and Registration Framework

Figure 3:
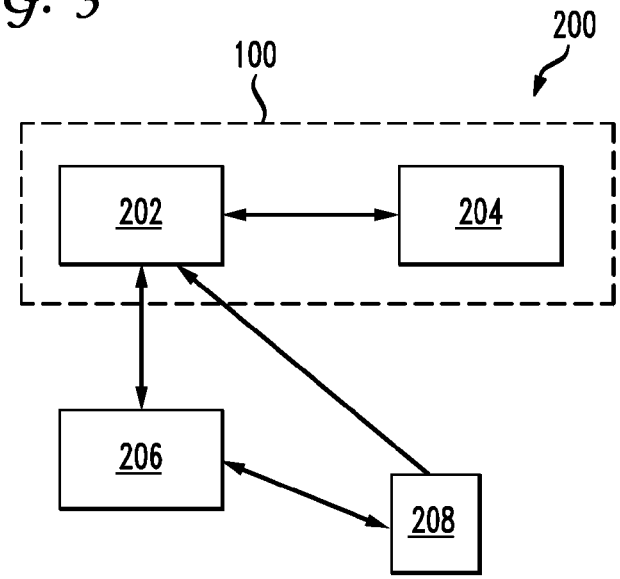
FIG. 3 is a block diagram of the architecture for the generic activation and registration framework (GARF), in accordance with one embodiment of the present invention.

FIG. 3 is a block diagram of the architecture for the generic activation and registration framework (GARF) 200, in accordance with one embodiment of the present invention. The GARF is a system for providing network activation and registration in a network that may have multiple carriers and/or service providers.

The GARF 200 provides a driver device 202 that generally controls network activation and registration procedures for the computer 100. Networking applications that may be tailored for a specific carrier or service provider are not included in the driver device. Rather, a plug-in device 204 (or multiple plug-in devices) may be installed in the computer 100. A plug-in device 204 includes hardware and/or software specifically tailored for a particular carrier and service provider. Through a given plug-in device 204, the computer 100 can communicate with a carrier and service provider that is intended for that plug-in device 204. For example, a driver device 202 may communicate with a provider's web server 206 with assistance from the plug-in device 204. Additionally, the provider's web server 206 can send a registration file 208 to the driver device 202, which can then launch the registration file 208 in the computer 100. The registration file 208 is an executable file configured to allow the computer 100 to be compatible with a particular carrier and/or service provider.

The GARF 200 allows manufacturers to build a computer 100 for operation in wireless networks of any verbal language. For example, a generic driver device 202 may be built that is nonspecific to any particular verbal language. The plug-in device 204, on the other hand, may then be configured to be language specific. If France, for instance, has three different service providers that operate the same way in the French language, the GARF 200 allows one computer 100 to communicate with all three service providers. In another embodiment, the plug-in device 204 is generically built such that the computer 100 is generically operable in any wireless network of any verbal language.

Overview of Driver Device

The driver device 202 is hardware, software, or combination thereof, that is configured to manage procedures of the GARF 200. In one embodiment, the driver device 202 includes an icon on the display screen 130 for a user to select. Selection of the icon launches GARF 200 procedures, including activating a wireless network with a carrier and handling user registration with a service provider. BellSouth™, used with Palm VII™, is an example of a carrier. Palm.Net™, used with Palm VII™, is an example of a service provider. Palm.Net™ currently resells BellSouth™ services for use with Palm VII™.

In one embodiment, the driver device 202 is an executable application that a user will launch upon their first interaction with a wireless capable computer 100. The driver device 202 will drive the configuration of the computer 100 to obtain wireless connectivity, as well as perform the tasks required to obtain an account and/or identity with a particular carrier and/or service provider. In one example, the driver device 202 may be launched by applications such as Clipper™ (used in the Palm™ operating system) when wireless connectivity has not yet been established for the computer 100.

A feature of the GARF 200 is the ability for a user to step through a number of screens in order to provide personal data to a wireless service provider, such as Palm.Net™. This setup process involves a number of steps, including retrieving the appropriate screen(s), entering user information, submitting the information to the driver device, writing the personal data in memory, and submitting the data to the service provider.

The driver device 202 is responsible for maintaining the system features (via the plug-in device 204). As an example, the Palm™ operating system requires certain system maintenance to ensure successful network transactions with the carrier and service provider. The driver device 202 accomplishes its tasks by launching a plug-in device 204 to activate the network on the device (and to display location/carrier-specific user interfaces and error messages). The driver device 202 can also call upon a registration file 208, which in turn may be configured to execute, registration procedures on the computer 100. The driver device 202 exposes and calls upon application program interfaces (API's) in both the plug-in device and the registration file 208.

The driver device 202 is not tailored to a specific carrier and/or service provider. Rather, the driver device 202 is generic to various carriers and/or service providers in a given wireless network. For example, the driver device 202 may be generally operable in all networks in France, but the internal components are not programmed to handle communications with one specific carrier and/or service provider. In one embodiment, the driver device 202 is built into the memory device 120 or, more specifically, into a read-only memory (ROM) portion of the memory device 120.

In one embodiment, communications from the provider's web server 206 to the driver device 202 are handled in a protocol that includes Hypertext Transfer Protocol (HTTP) over Transmission Control Protocol/Internet Protocol (TCP/IP). Communications from the driver device 202 to the carrier are handled in a protocol that includes Hypertext Transfer Protocol (HTTP) over Compressed Transfer Protocol (CTP), or the carrier's own network protocol is used. Another embodiment handles communications with File Transfer Protocol (FTP) over TCP/IP. Other types of TCP/IP-based protocols may alternatively be used to communicate. The present invention is not limited to the specific protocols disclosed herein.

In an alternative embodiment, deactivation of the carrier and de-registration of the service provider can occur. A computer 100 is deactivated when the computer 100 is no longer enabled to communicate in the wireless network. A computer 100 is de-registered when the computer 100 no longer has an account with a service provider. Deactivation or de-registration can occur in at least the following two ways: some external process (outside of the computer 100) can be invoked to execute deactivation or de-registration; or the plug-in device 204 can be explicitly prompted to execute deactivation or de-registration.

To deactivate/de-register a computer 100, the driver device 202 searches through all plug-in devices 204 in the computer 100. If no plug-in devices 204 are found, deactivation is complete because without a plug-in device, a computer 100 is not network activated. In searching for plug-in devices 204, the computer 100 determines which network plug-in device is responsible for deactivation. The driver device 202 launches the found plug-in with a deactivation code. Note that the deactivation code must be accompanied by appropriate parameters to denote the desired plug-in device for deactivation. If the plug-in device also contains the service provider's registration (or de-registration) set of codes, the driver device 202 must determine whether to launch the plug-in device 204 with a "de-register" code first. In one embodiment, the deactivation code is called by a registration file 208 that is in the process of deactivating a component of service.

Overview of Plug-in Device

The plug-in device 204 is hardware, software, or combination thereof, that allows the computer 100 to be compatible with a particular carrier and/or particular service provider. In a preferred embodiment, the plug-in device 204 is an interface between software (e.g., wireless browser application) and hardware (e.g., mobile radio device 140) in the computer 100.

The plug-in device 204 may be configured to assist in establishing activation and registration, by executing functions such as the following: setting system features for the network activation upon resetting of the GARF 200; network activation/deactivation with a particular carrier and/or registration/de-registration with a particular service provider; maintenance of account identification for a particular carrier and/or particular service provider; and initiating appropriate user interfaces during error conditions.

In a preferred embodiment, the plug-in device has the following two primary purposes upon launch by the driver device 202: (1) activate the computer 100 on a wireless network; and (2) register the computer 100 with a service provider such as Palm.Net™, thereby allowing the computer 100 to utilize the service provider's wireless services. The purpose of the GARF 200 is to perform common procedures in the wireless network. The plug-in device 204 is the component of the GARF 200 that contains differences for a particular mobile radio device 140, a particular carrier, and a particular service provider, among other things. In one embodiment, the plug-in device 204 is an executable file that is easily installable into memory of the computer 100.

A plug-in device 204 is responsible for network activation and/or registration, setting system features, and updating the memory state of the computer 100 according to the network being activate. In one embodiment, the plug-in device 204 is tailored for a particular carrier and particular service provider. BellSouth™ is an example of a carrier. Palm.net™ is an example of a service provider. The carrier and service provider, in turn, operate in a particular type of network. Mobitex™ is an example of a wireless packet data network. Other examples of a network include a cell phone network, a digital personal communications service (PCS) network, and a global system for mobile communications (GSM) network. Thus, the plug-in is further configured to be compatible with the network in which the particular carrier operates.

As a secondary function, the plug-in device 204 provides error and warning code user interfaces, which are tailored to a particular verbal language (e.g., French, English, German, Spanish).

In another embodiment, the plug-in device 204 is designed to be compatible with multiple carriers and service providers in a given network. For example, the plug-in device 204 may be multiplexed to receive a call from the driver device 202, and the plug-in device 204 may then switch between different carriers, depending on the call. In still another embodiment, multiple, different plug-in devices 204 may be installed in the computer 100, for example, to allow the user to have a choice of various carriers and/or service providers. In yet another embodiment, a general plug-in device 204 is provided, for example, a plug-in device compatible with an English language wireless network covering all of North America. Alternatively, a more specific plug-in device 204 may be installed to handle carriers and service providers, for example, in just the western United States.

Further, the different plug-in devices 204 may be configured to be compatible with each other. Regardless of the particular configuration of the plug-in devices 204, however, a plug-in device 204 is a component that can be readily redesigned after a computer 100 has been manufactured. Such flexibility of a plug-in device 204 is useful because hardware and software components in a computer 100 may be entrenched within the computer's operating system (e.g., the ROM). Thus, the plug-in device 204 provides a component for the computer 100 that facilitates changing the computer's compatibility for different carriers and/or service providers.

Regarding commands that the driver device 202 sends to the plug-in device 204, a plug-in device 204 is preferably designed to handle certain predefined launch codes from the driver device 202. Table 1 below contains examples of launch codes that may be used in the Palm™ operating system.

TABLE 1

Examples Of Launch Codes That
Driver Device 202 May Include In A Command
Sent To Plug-In Device 204

| | |
|---|---|
| PLUGIN_TYPE | Return a wireless network or service provider, or both to the caller-noting the type of plug-in |
| WN_RESET | Set any system features needed for network stack of device release |
| SP_RESET | Set any system features needed for service provider |
| CK_WN_ACTIVATE | Check system feature and memory values (when system features may not be correct) to determine (true or false) if the wireless network is active |
| WN_ACTIVATE | Configure a device so that it is able to effectively communicate on the network |

TABLE 1-continued

Examples Of Launch Codes That
Driver Device 202 May Include In A Command
Sent To Plug-In Device 204

| | |
|---|---|
| WN_DEACTIVATE | Perform a wireless network deactivation |
| CK_SP_REGISTER | Check system features and database entries (when system features may not be correct) to determine (true or false) if the service provider has been registered with. If the service provider has not been successfully registered with, this call will return false, with an optional parameter of a URL. The URL can then be used by the driver to retrieve a registration file 208. |
| SP_DEACTIVATE | Remove any system features, database entries, or flash values utilized by the service provider to denote successful registration. |
| SP_COMPLETE | Perform any service-provider-centric flash/system feature/database entry activity that denotes the FINAL step of activation and registration |
| SP_FAIL | Perform any service-provider-specific cleanup activity that must be performed to return the state of the device to normal |

Overview of Auxiliary Screen Flow

In order to create and provision accounts with a given service provider, the service provider most-likely wants to collect data about the user. Such data may include name, address, account identifier, password, etc.

The auxiliary screen flow of the GARF 200 involves downloading and executing a registration file 208 from the provider's web server 206. A registration file 208 is preferably an executable file configured to be executed as-is on the computer 100. (In the Palm™ operating system, an executable file is commonly referred to as a "PRC".) The registration file 208 renders a set of dialogs (or "screens") to collect user registration data. The registration file has a calling convention and an expected set of results. The driver device 202 can then control procedures to set up the account for the user.

In other words, in order to collect user information for service provider registration, the driver device 202 has the ability to dynamically query (i.e., download) a server of the provider for the registration file 208. The registration file 208 is preferably kept as minimal in size as possible so as not to unduly delay the user's experience. As an example, the plug-in device sends a uniform resource locator (URL), or address, to the driver device 202. The driver device 202 in turn sends a request to the provider's web server 206 to retrieve the registration file 208 located at the URL. Once retrieved, the registration file 208 may be executed on the computer 100 to collect user registration data. In one embodiment, execution of the registration file 208 involves communicating directly with the web, without first going through the driver device 202.

The registration file 208 should be a temporary executable file configured to delete itself after its operations have been performed (i.e., after registration is complete). The registration file 208 should exit execution successfully (or with a failure error) directly to the driver device 202, so that any cleaning-up or processing by the computer 100 may resume. In, other words, the registration file 208 should not leave the computer 100 in an unstable state. In one embodiment, the registration file 208 uses Compressed Transfer Protocol (CTP) calls. The registration file 208 may be configured to utilize error and warning user interfaces contained within the plug-in device 204. In a preferred embodiment, the registration file 208 is configured to utilize error and warning user interfaces contained within the registration file 208 itself.

The registration file 208 can be configured dynamically by the service provider. For example, if the service provider changes its rate plan, the registration file 208 can readily be changed to accommodate the new rate plan. The new rate plan can then be displayed to the user when the registration file 208 is downloaded and executed on the computer 100. Note that the registration file 208 resides outside of computer 100 (at provider's web server 206, for example) before the registration file 208 is downloaded and executed by the driver device 202.

Overview of Provider's Web Server

In a preferred embodiment, the provider's web server 206 is accessible via a communication network. Examples of a communication network include a local area network (LAN), a wide area network (WAN), the global packet-switched network known as the "Internet" or the "World Wide Web" (web). The web server 206 provides the registration files 208 of the auxiliary screen flow, as well as any other logic to be used from within the executable file. In one example, the provider's web server 206 is accessible via the Internet through Palm™ Web Clipping Proxy Servers. HTTP is the proxiable protocol handled by Web Clipping Proxy Servers.

As discussed above with reference to the auxiliary screen flow, the plug-in device 204 may return a URL to the driver device 202. The URL is then sent as a request to the provider's web server 206. That URL returns one static registration file 208 for the auxiliary screen flow. Accordingly, the service provider preferably carves some space from its file system directory to store the screens for the execution of the registration file 208.

Process Overview

Figure 4:
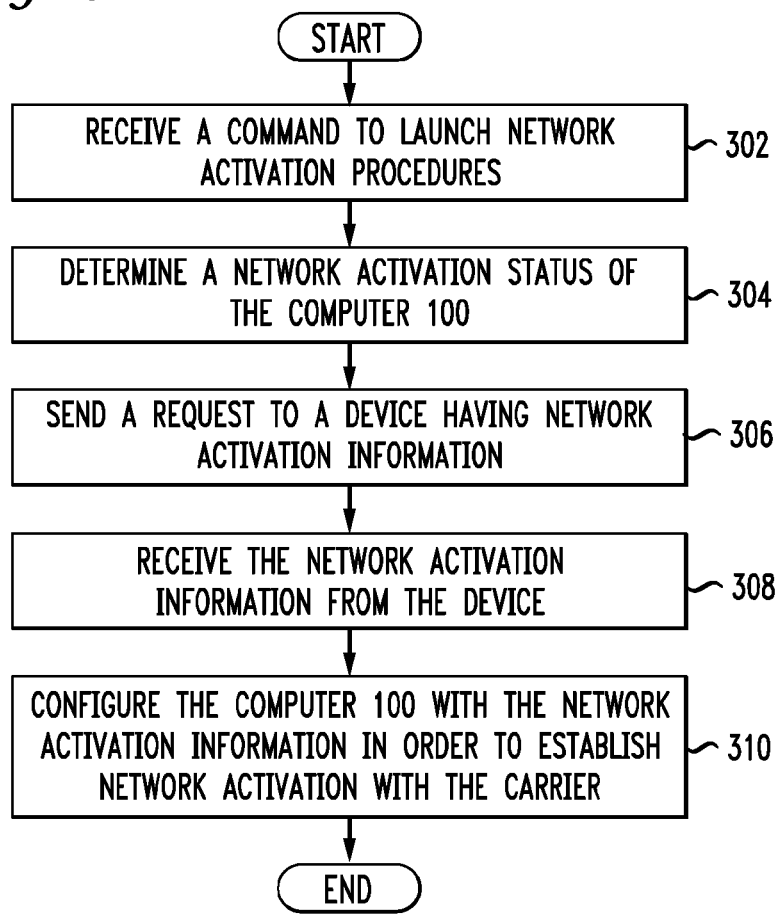
FIG. 4 shows a flowchart for a method of handling network activation between a computer and a carrier, in accordance with one embodiment of the present invention.

FIG. 4 shows a flowchart for a method of handling network activation between a computer and a carrier, in accordance with one embodiment of the present invention. The method starts in step 302 where a command is received to launch network activation procedures. For example, upon being launched, the driver device 202 sends a command to the plug-in device 204 to launch the plug-in device.

In step 304, a network activation status of the computer is then determined. This determination of network activation includes determining if the computer 100 is network enabled, as discussed above with reference to FIG. 3. For example, it may be determined if a valid single in-line memory module (SIMM) card is present in the computer 100. A SIMM card contains all the chips needed to make a computer operable in a particular network. SIMM cards, for instance, are used in certain European wireless networks to allow a computer to be compatible with a particular carrier or transport mechanism. A valid SIMM card means that the computer 100 is network enabled, and the method may then proceed. Without network enablement, an error message would be displayed to the user. Further, if the computer 100 was previously configured using the current SIMM card, the computer 100 is considered to be network activated. Control is returned to the generic driver device 202, and the method would then be done. However, if the computer 100 needs to be configured with the current SIMM card, the method proceeds to step 306.

In another example of step 304, it may be determined if the computer is at all capable of communicating in the present network. For instance, it may determined if the plug-in device 204 allows the computer 100 to communicate in the network. Network activation is discussed above with reference to FIG. 3. It may be determined here if the computer 100 is in a state to operate in a network that requires a general access number. The general access number would allow the computer 100 to have access to the present wireless network. As part of step 304, the plug-in device 304 may also query the user for a security key in order for the computer to utilize services of the carrier. If a valid security key is inputted, the method continues to step 306.

In step 306, a request is sent to a device having network activation information. In one example, the device having network activation information is a SIMM card within the computer 100 itself. The plug-in device 304 may query the SIMM card for information regarding activation with the particular carrier/transport mechanism. In another example of step 306, the device having network activation information is a network device of the carrier. The plug-in device 304 may query this network device for an access number specific to the carrier. Each carrier communicates with the plug-in device 204 in a protocol specific to the carrier. In the Mobitex™ network, for instance, a 24-bit Mobitex™ access number (MAN) is used to establish that a computer 100 has access to the services of Mobitex™. The plug-in device 204 and the network device of Mobitex™ communicate using the Mobitex™ protocol. The requested information is received, in step 308, from the particular device that is called.

In step 310, the computer is configured with the network activation information in order to establish network activation, with the carrier. In one example, the plug-in device 204 may take network activation information received from a SIMM card and configure the computer 100 accordingly. Such configuration operations may involve updating the memory of the computer 100 to include carrier specific information. In another example, the plug-in device 204 may take the carrier's access number received from the carrier and configure the computer 100 accordingly.

In one embodiment, the method steps of FIG. 4 are handled by the plug-in device 204. As discussed above with reference to FIG. 3, the plug-in device 204 is an interface between hardware and software in the computer 100 and allows the computer 100 to be compatible with a particular carrier. The following tables include high-level pseudo-code for procedures that may be managed by the plug-in device 204. These procedures may be implemented in a computer 100 using common programming techniques, including the use of programming languages such as C, C++, Pascal, Java, assembly language, etc.

TABLE 2

Example Of High-level Pseudo-code For
Procedures Managed By A Plug-In Device 204 In A
European Wireless Network For A Palm ™ Computer If (valid SIM card exists in unit)
{
    if (unit previously network activated &&| current SIM card == last
activated SIM card)
    {
        return success to generic application
    }
    else
    {
        Configure unit with current SIM card information
        Display message to user about successful network
activation TABLE 2-continued Example Of High-level Pseudo-code For
Procedures Managed By A Plug-In Device 204 In A
European Wireless Network For A Palm ™ Computer

```
        Return success to generic application
    }
}
else
{
    Display message to user about no valid SIM card in unit.
    Return failure to generic application
}
```

TABLE 3

Example Of High-level Pseudo-code For
Procedures Managed By A Plug-Tn Device 204 In A
Mobitex ™ Wireless Network For A Palm ™ Computer

```
If (unit in GMAN* state)
{
    Ask user for activation security key
    if (security key is valid)
    {
        request UMAN* from Bell South
        if (retrieve UMAN successfully)
        {
            configure unit with UMAN
            return success to generic application
        }
        else
        {
            Display error message to user
            Allow option to user to try again or exit with
failure to generic
Application
        }
    }
    else
    {
        Allow user to try again or exit to application with
failure
    }
}
else
{
    return success to generic application
}
```

*GMAN = generic MAN (AGW MAN only)
*UMAN = nongeneric MAN (one that works on the network without being contained to AGW)

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, determining a network activation status, sending a request to a device having network activation information, and configuring the computer 100 with network activation information, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method in a computer of handling network activation, the method comprising:
   receiving at a plurality of plug-in devices a command from a driver to initiate network activation procedures with a selected telecommunications carrier, wherein said driver is generic to various telecommunications carriers and said plug-in device includes components that are tailored to activate the computer with a selected telecommunications carrier and register the computer with a selected service provider;
   determining at one of the plurality of plug-in device a network activation status of the computer;
   sending, by one of the plurality of plug-in device, a request to a device having network telecommunications carrier activation information in a registration file provided by said selected service provider;
   receiving, at one of the plurality of plug-in device, the network telecommunications carrier activation information from the device; and
   configuring the computer with the network telecommunications carrier activation information in order to establish network activation with the telecommunications carrier,
   wherein said plurality of plug-in devices can be tailored to multiple carriers in any language;
   wherein the plug-in device components step through a setup process comprising: retrieving the appropriate screens, entering user information, submitting the information to the driver device, writing the personal data in memory, and submitting the data to the service provider; and wherein said plurality of plug-in devices are compatible with each other of said plurality of plug-in devices.

2. The method of claim 1, wherein the received command includes a launch code to initiate a particular network telecommunications carrier activation procedure.

3. The method of claim 1, wherein the device having network telecommunications carrier activation information is a single in-line memory module (SIMM) card configured to be compatible with the telecommunications carrier.

4. The method of claim 1, wherein the step of determining a network telecommunications carrier activation status comprises determining if the computer has a current single in-line memory module (SIMM) card that is compatible with the telecommunications carrier.

5. The method of claim 4, wherein the step determining a network telecommunications carrier activation status further comprises:
   determining if the computer was previously network activated with a previous single in-line memory module (SIMM) card; and
   determining if the previous SIMM card is the current SIMM card.

6. The method of claim 1, wherein the step of determining a network telecommunications carrier activation status comprises:
   receiving an activation security key from a user of the computer; and
   determining if the activation security key is valid for the telecommunications carrier.

7. The method of claim 1, wherein the device having network telecommunications carrier activation information is a server of the telecommunications carrier.

8. The method of claim 7, wherein the steps of sending and receiving are carried out in a protocol specific to the telecommunications carrier.

9. The method of claim 7, wherein the network telecommunications carrier activation information that is received includes an access number that allows the computer to access network services of the telecommunications carrier.

10. The method of claim 1, wherein the step of configuring the computer comprises storing an access number that allows the computer to access network services of the telecommunications carrier.

11. The component configured to be operable in a generic activation framework with multiple carriers in any language comprising:
   a plurality of plug-in devices installable and removable from a processing unit;
   an application program interface (API) tailored to a particular telecommunications carrier, wherein the API is configured to receive a network telecommunications carrier activation command from a driver device in a computer that is generic to various telecommunications carriers; and an API tailored to a particular service provider in a registration file provided by said particular service provider, wherein the API is configured to receive a service provider activation command from the driver device;
   wherein said plurality of plug-in devices can be tailored to multiple carriers in any language;
   wherein the API steps through a setup process comprising: retrieving the appropriate screens, entering user information, submitting the information to the driver device, writing the personal data in memory, and submitting the data to the service provider; and
   wherein said plurality of plug-in devices are compatible with each other of said plurality of plug-in devices.

12. The component of claim 11, wherein the component is an application configured to be initiated in a personal digital assistant.

13. The component of claim 11, further comprising a user interface configured to query a user for an activation security key to access services of a telecommunications carrier.

14. The component of claim 11, wherein upon receiving a particular network telecommunications carrier activation command from the generic driver device, the application program interface (API) is configured to cause the plug-in device to determine a network telecommunications carrier activation status of the computer.

15. A computer-readable medium carrying one or more sequences of one or more instructions for handling a network telecommunications carrier activation, the one or more sequences of one or more instructions including instructions which, when executed by one or more processors, cause the one or more processors to perform the steps of:
   receiving at a plurality of plug-in devices a command from a driver to launch network activation procedures with a selected telecommunications carrier, wherein said driver is generic to various telecommunications carriers and said plurality of plug-in devices includes components that are tailored to activate the computer with the selected telecommunications carrier and register the computer with the selected service provider;
   determining at one of the plurality of plug-in device a network activation status of the computer;
   sending, by one of the plurality of plug-in device, a request to a device having network telecommunications carrier activation information;
   receiving, at one of the plurality of plug-in device, the network telecommunications carrier activation information from the device in a registration file provided by said selected service provider; and
   configuring the computer with the network telecommunications carrier activation information in order to establish network activation with the telecommunications carrier,
   wherein said plurality of plug-in devices can be tailored to multiple carriers in any language;
   wherein the plug-in device components step through a setup process comprising: retrieving the appropriate screens, entering user information, submitting the information to the driver device, writing the personal data in memory, and submitting the data to the service provider; and
   wherein said plurality of plug-in devices are compatible with each other of said plurality of plug-in devices.

16. The computer-readable medium of claim 15, wherein the received command includes a launch code to initiate a predefined network telecommunications carrier activation routine.

17. The computer-readable medium of claim 15, wherein the device having network telecommunications carrier activation information is a single in-line memory module (SIMM) card configured to be compatible with the telecommunications carrier.

18. The computer-readable medium of claim 15, wherein the step of determining a network telecommunications carrier activation status further causes the processor to carry out the step of determining if the computer has a current single in-line memory module (SIMM) card that is compatible with the telecommunications carrier.

19. The computer-readable medium of claim 18, wherein the step of determining a network telecommunications (carrier) activation status furthermore causes the processor to carry out the steps of:

determining if the computer was previously network telecommunications carrier activated with a previous single in-line memory module (SIMM) card; and determining if the previous SIMM card is the current SIMM card.

20. The computer-readable medium of claim 15, wherein the step of determining a network telecommunications carrier activation status further causes the processor to carry out the steps of:

receiving an activation security key from a user of the computer; and determining if the activation security key is valid for the telecommunications carrier.

21. The computer-readable medium of claim 15, wherein the device having the network telecommunications carrier activation information is a server of the telecommunications carrier.

22. The computer-readable medium of claim 15, wherein the steps of sending and receiving are carried out in a protocol specific to the telecommunications carrier.

23. The computer-readable medium of claim 21, wherein the network telecommunications carrier activation information that is received includes an access number that allows the computer to access network services of the telecommunications carrier.

24. The computer-readable medium of claim 15, wherein the step of configuring the computer further causes the processor to carry out the step of storing an access number that allows the computer to access network services of the telecommunications carrier.

* * * * *